Patented Mar. 13, 1923.

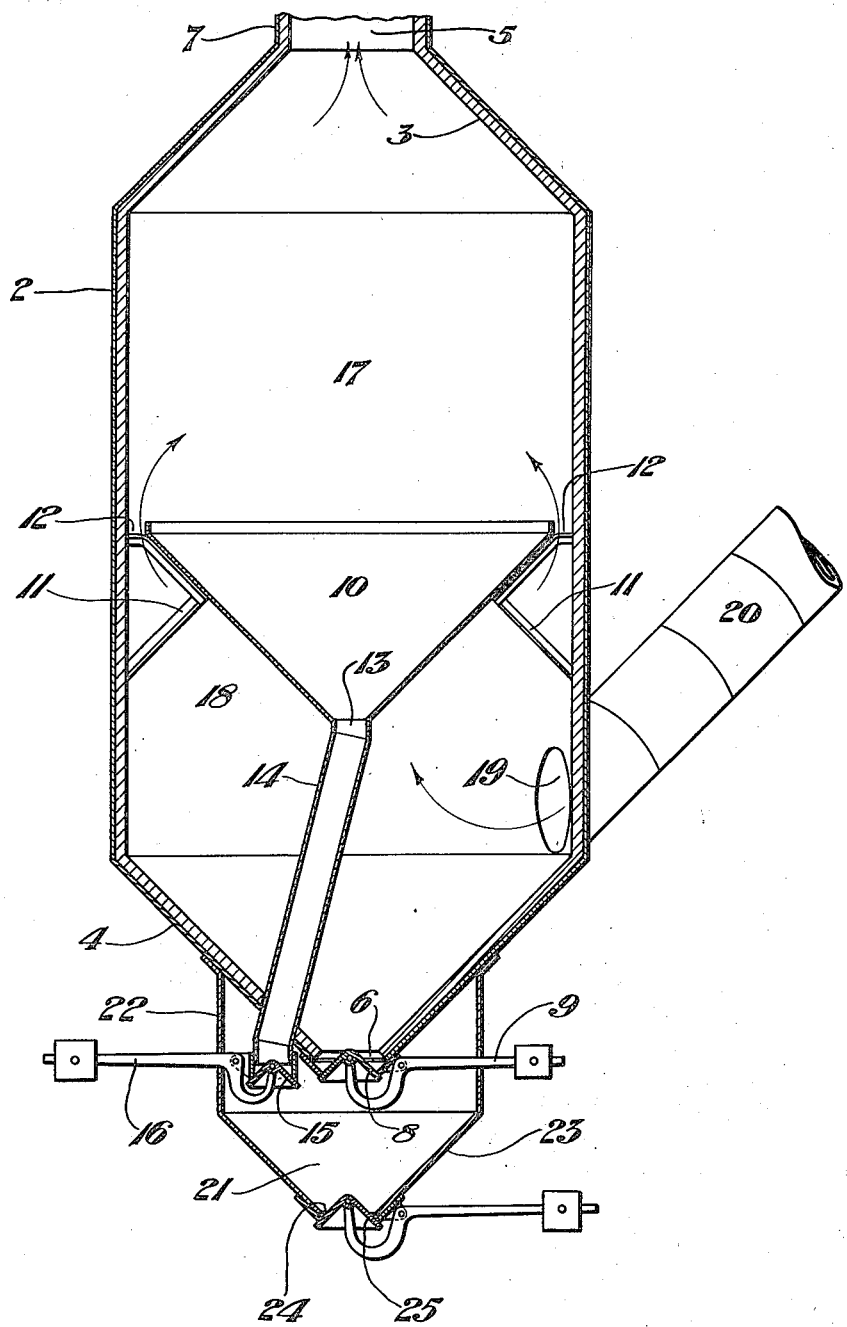

1,448,430

UNITED STATES PATENT OFFICE.

EARLE W. BROWN, OF ELYRIA, OHIO.

DUST CATCHER.

Application filed September 7, 1922. Serial No. 586,744.

*To all whom it may concern:*

Be it known that I, EARLE W. BROWN, a citizen of the United States, and resident of Elyria, in the county of Lorain and State of Ohio, have invented certain new and useful Improvements in Dust Catchers, of which the following is a specification.

This invention relates to dust catchers and more particularly to dust catchers for dry cleaning blast furnace gases, and has for its object the provision of a dust catcher of this type adapted to cause a more complete stagnation of the gases than catchers heretofore constructed and, therefore, a more complete and better separation of the gases and dust.

Dust catchers of this class as heretofore constructed consisted generally of a cylindrical shell having a hopper bottom provided with a discharge port at its lower end for the discharge of the dust, and with a gas inlet in the top and an outlet in the side of the shell, or vice versa. The principle on which such dry dust catchers operate is that the reduction in velocity of the gases as they enter the catcher will permit the dust to drop to the bottom or hopper portion of the device. However, dust catchers constructed as above defeated their principle of operation, due to the formation of eddy currents which prevented the dust from settling.

The present invention eliminates the above difficulties by preventing the formation of eddy currents of the gases, and affords a better and more complete separation of the gases and dust by providing a two stage expansion and reduction of velocity of the gases.

In the drawings, the figure is a vertical sectional elevation through a dust catcher constructed in accordance with this invention.

Referring more particularly to the drawing, the numeral 2 designates the cylindrical shell or housing of the dust catcher which has a frusto-conical top portion 3 and a frusto-conical bottom portion 4 having outlet openings 5 and 6, respectively. A clean gas conduit or pipe 7 is connected to the outlet 5 in the top portion 3, and the outlet 6 is closed by a bell valve 8 having a counterweighted operating lever 9.

A frusto-conical hopper 10 is secured to bracket members 11 approximately midway between the ends of the shell or housing 2, and is of such a diameter that its upper end is spaced from the side walls of the shell forming an annular gas passage 12. The lower end of the hopper 10 is provided with an opening 13 for the discharge of dust, and a conduit 14 communicates with the opening 13 and extends downwardly through the bottom 4 of the shell or housing 2 at a point to one side of the outlet opening 6. The lower end of the conduit 14 is closed by a bell valve 15 having a counterweighted operating lever 16.

The hopper 10 divides the dust catcher into upper and lower dust catching chambers 17 and 18, the lower chamber 18 being the initial dust catching chamber and being provided with a gas inlet port 19 connected with a gas supply conduit 20 for uncleaned gases.

A dust receiving chamber 21 is formed by a shell 22 secured to the bottom portion 4 and enclosing the outlet opening 6 and lower end of the conduit 14. The shell 22 is provided with a frusto-conical bottom portion 23 having a discharge opening 24 closed by a bell valve 25. The dust receiving chamber 21 together with the bell valves 8 and 15 forms a double seal for the dust discharge ports.

The operation of this dust catcher is as follows—The furnace gases, upon entering the dust catcher through the pipe 20, expand in the chamber 18 and their velocity is consequently reduced, so that the major portion of the coarse dust and heavy particles of coke, limestone, etc., carried by them drop to the bottom of this chamber, where they may be discharged through the opening 6 into the chamber 21. The partially cleaned gases then pass into the chamber 17 through the annular gas passage 12 and their velocity is increased as they pass through the passage 12, and again reduced as they expand upon entering the chamber 17, thus causing a second separation of dust from the gases.

Due to the second reduction in velocity of the gases in the space or chamber 17, and the fact that any gas currents above the hopper 10 must pass up along the inner surface of the shell or housing 2, and so do not disturb the central body of stagnant gases, a very complete separation of dust takes place in the chamber 17.

It will be expressly understood that several hoppers 10 may be used in a dust catcher if desired, they being spaced one above the other, thus providing for a succession of contractions and expansions of the gases, and it is evident that in some installations such a construction may be desirable.

While I have shown only one preferred embodiment of my invention, it will be understood that various modifications may be made without departing from the spirit of my invention as defined in the appended claims.

I claim:—

1. A dust catcher for use with blast furnace gas comprising an outer housing having a conical top and a frusto-conical bottom and outlet openings arranged centrally in said top and bottom portions, at least one frusto-conical hopper secured intermediate the ends of said housing and spaced from the side walls thereof to form an annular gas passage, said hopper having an outlet opening in its lower end, a conduit communicating with said outlet opening and extending through the bottom of said housing, a conduit for uncleaned gas entering through the side wall of said housing below said hopper, a clean gas conduit communicating with the outlet opening in the top portion of said housing, means for closing the conduit leading from the outlet in said hopper, and other means for closing the outlet opening in the bottom of said housing.

2. A dust catcher for use with blast furnace gas comprising an outer housing having a conical top and a frusto-conical bottom and outlet openings arranged centrally in said top and bottom portions, at least one frusto-conical hopper secured intermedial the ends of said housing and spaced from the side walls thereof to form an annular gas passage, said hopper having an outlet opening in its lower end, a conduit communicating with said outlet opening and extending through the bottom of said housing, a dust receiving chamber secured to the lower end of said housing and enclosing the lower end of said conduit and the outlet opening in the bottom of said casing, bell valves for normally closing said conduit and said outlet opening, a conduit for uncleaned gas entering through the side wall of said housing below said hopper, and a clean gas conduit communicating with the outlet opening in the top portion of said housing.

3. A dust catcher for use with blast furnace gas comprising the combination with an outer cylindrical housing having a conical top and frusto-conical bottom and outlet openings arranged centrally in said top and bottom portions, and a conduit for uncleaned gases entering through the side wall of said housing adjacent its lower end, of a frusto-conical hopper member secured within said housing approximately midway between its ends and spaced from the side walls thereof so as to form an annular gas passage therearound, said hopper dividing said housing into lower and upper dust catching chambers and causing the gases to expand in each of these chambers thereby decreasing their velocity and forcing them to drop their impurities or dust, a dust receiving chamber secured to the bottom portion of said housing and enclosing the outlet opening in said bottom portion, and a conduit leading from said hopper to said dust receiving chamber.

In testimony whereof, I have hereunto signed my name.

EARLE W. BROWN.